United States Patent
Buhrmaster et al.

[11] Patent Number: 5,916,133
[45] Date of Patent: Jun. 29, 1999

[54] AUTOMOTIVE HYDROCARBON ADSORBER SYSTEM

[75] Inventors: Carol L. Buhrmaster; William Hertl; Mallanagouda D. Patil, all of Corning; Louis S. Socha, Jr.; Jimmie L. Williams, both of Painted Post, all of N.Y.

[73] Assignee: Corning Incorporated, Corning, N.Y.

[21] Appl. No.: 08/871,668

[22] Filed: Jun. 9, 1997

Related U.S. Application Data

[60] Provisional application No. 60/022,344, Jul. 24, 1996, provisional application No. 60/022,325, Jul. 24, 1996, and provisional application No. 60/022,345, Jul. 24, 1996.

[51] Int. Cl.⁶ .............................. F01N 3/00; B01D 50/00
[52] U.S. Cl. ............................. 60/297; 60/301; 60/307; 422/171; 422/176
[58] Field of Search .................... 60/287, 288, 299, 60/301, 319, 289, 307, 297; 422/176, 177, 180, 171

[56] References Cited

U.S. PATENT DOCUMENTS

| | | | |
|---|---|---|---|
| 3,853,485 | 12/1974 | Hogan | 422/180 X |
| 4,566,882 | 1/1986 | Hoffmann et al. | 422/176 X |
| 5,065,576 | 11/1991 | Kanazawa et al. | 60/299 X |
| 5,130,100 | 7/1992 | Serizawa | 60/301 X |
| 5,693,294 | 12/1997 | Anderson et al. | 60/288 X |
| 5,693,877 | 12/1997 | Ohsuga et al. | 60/287 X |
| 5,814,285 | 9/1998 | Kojima et al. | 422/177 |

FOREIGN PATENT DOCUMENTS

| | | |
|---|---|---|
| 0 661 098 | 7/1995 | European Pat. Off. . |
| 0 697 505 | 2/1996 | European Pat. Off. . |
| 0 697 505 A1 | 2/1996 | European Pat. Off. . |
| 4-11951 | 1/1992 | Japan . |
| 1 455 351 | 11/1976 | United Kingdom . |
| 95/18292 | 7/1995 | WIPO . |

*Primary Examiner*—John E. Ryznic
*Attorney, Agent, or Firm*—Kees van der Sterre

[57] ABSTRACT

An improved system for the control of combustion engine exhaust from a motor vehicle includes an adsorber for the adsorption of hydrocarbons concentrated in the exhaust stream at engine startup, the adsorber being of honeycomb shape which includes a peripheral channeled portion and a central channeled portion, the latter including an exhaust gas by-pass port parallel with the channels, with the through-channels in the central portion of the honeycomb having a relatively high resistance to exhaust gas flow compared to the channels traversing the peripheral portion. Systems with reduced secondary air requirements and providing more efficient burn-off of the adsorbed hydrocarbons are also disclosed.

10 Claims, 2 Drawing Sheets

AUTOMOTIVE HYDROCARBON ADSORBER SYSTEM

BACKGROUND OF THE INVENTION

This application claims the benefit of prior-filed copending provisional applications Ser. Nos. 60/022,344 filed Jul. 24, 1996 by W. Hertl et al., 60/022,325 filed Jul. 24, 1996 by C. Buhrmaster et al., and 60/022,345 filed Jul. 24, 1996 by C. Buhrmaster et al.

Current automotive exhaust systems equipped with catalytic conversion systems comprise an exhaust line connecting with a converter housing, the housing enclosing a ceramic or metal honeycomb substrate supporting an oxidation or three-way emissions control catalyst mounted therein. A connector or so-called inlet cone is generally provided to connect the relatively small exhaust pipe with the larger catalytic substrate housing, this cone being the primary means for distributing the exhaust gas across the inlet face of the honeycomb support.

It has been recognized that exhaust gas velocities through central channels of these honeycombs (i.e., the channels disposed immediately opposite and downstream of the exhaust pipe opening into the housing) are often much higher than those through adjacent, peripheral honeycomb channels. While this can be an advantage in terms of catalyst heat-up, a number of approaches have been developed to obtain a more uniform flow profile through these honeycombs, for better catalyst utilization. One such approach has been to increase the flow resistance of the central or high flow channels. This can be achieved, for example, by reducing channel hydraulic diameter in central portions of the honeycombs, as in U.S. Pat. No. 3,853,485.

Tightened emissions standards for automotive gasoline engines have placed higher demands on the performance of these catalytic conversion systems. Particularly critical for overall system performance is performance during the so-called "cold start" phase of engine operation. This is the period of engine operation just after cold engine start and prior to startup or "light off" of the catalytic converter, during which the highest concentrations of unburned hydrocarbons are released into the atmosphere.

One type of exhaust system, designed specifically to address the cold-start problem, provides a hydrocarbon (e.g., unburned fuel and combustion by-products) adsorber in the exhaust line. The adsorber operates to trap the hydrocarbons emitted, particularly at engine startup, and then to release the hydrocarbons to the catalytic converter after converter light-off has been achieved. A preferred configuration for an adsorber in such systems is a honeycomb similar in structure to a catalyst support honeycomb but composed of or supporting a coating of a hydrocarbon adsorbent such as carbon, zeolite, or another molecular sieve material.

Examples of recently developed cold-start engine emissions control systems are disclosed in published patent applications WO 95/18292, EP 0661098 and EP 0697505. A common feature of these systems is a ported adsorber, e.g., an adsorber incorporating an integral by-pass port within the body of its structure. Typically located downstream of a first catalytic converter, this adsorber is positioned upstream of a second or so-called "burn-off" catalytic converter so that hydrocarbons trapped by the adsorber at engine startup can subsequently be desorbed and released to the downstream converter as the adsorber is heated by the warming exhaust gases.

A particular advantage of the ported adsorber design is the faster light-off of the downstream catalytic converter, due to exposure of that converter to the high-velocity exhaust gases passing through the adsorber port. In the design of EP 0697505, control over the flow of the exhaust gases through the adsorber is obtained by means of a fluidic diverter which delivers a control gas stream for diverting the exhaust gases toward or away from the adsorber port in the course of engine operation.

While systems such as shown in the aforementioned publications offer significant advantages for the control of vehicle emissions during the cold start phase of engine operation, still further improvements are required. In particular, system simplification, more efficient adsorption of unburned hydrocarbons at engine startup, more complete combustion of the unburned hydrocarbons upon release from the adsorber, and extended service life for the adsorbers employed in these systems, are needed.

SUMMARY OF THE INVENTION

The invention provides an improved system for the treatment of combustion engine exhaust gases, based on an improved adsorber design for ported adsorber systems such as above described. More particularly, the invention comprises an improvement in exhaust systems of the type wherein an exhaust conduit supplies exhaust gas to an adsorber mounted in an enclosure downstream of an engine, wherein the adsorber comprises a honeycomb having a plurality of channels with hydrocarbon-adsorbing walls running from its inlet face to its outlet face and incorporating an integral by-pass port for the transmission of exhaust gas past the adsorbing channels.

Conventionally, these systems include a catalytic converter mounted downstream of the adsorber, and a diverter line having an outlet within the adsorber enclosure and upstream of the adsorber by-pass port for delivering at the port a diversion fluid such as air from a source external to the enclosure. The diverter provided in these systems acts mainly to direct the flow of exhaust gases away from the by-pass port and through the honeycomb channels for effective hydrocarbon adsorption during the early or cold-start phase of engine operation.

The exhaust system of the invention employs an improved adsorber design wherein the honeycomb structure has central and peripheral portions of differing flow characteristics. Traversing the central portion of the honeycomb, in addition to the bypass port, is a first plurality of channels having a relatively high resistance to exhaust gas flow. A second plurality of channels, traversing the peripheral portion of the honeycomb adsorber, has a relatively low resistance to exhaust gas flow.

In a specific embodiment of the invention, the honeycomb adsorber comprises an inlet face and/or an outlet face of generally convex configuration. The purpose of this inlet and/or outlet face design is to insure that the first plurality of honeycomb channels, i.e., those proximate to the by-pass port, are of longer average length than the second plurality of honeycomb channels proximate to the periphery of the honeycomb. Any of a number of different face configurations, including but not limited to frustoconical, stepped, or smoothly curved to circular, parabolic, or elliptical profiles could be used to achieve the desired effect. The resulting differences in channel length modify the flow resistance and thus the gas flow velocities through the channels, so as to make flow velocities through the peripheral channels more closely match the gas flow velocities through the more central channels.

Further improvements in system performance in accordance with the invention are obtained by more efficient processing of the adsorbed hydrocarbons in the later stages of engine warm-up. In a first aspect, considerable simplification of the cold-start system is achieved by employing the secondary air used as the diversion fluid not only to control exhaust flow through the adsorber honeycomb, but also to control exhaust gas stoichiometry for optimal treatment of the desorbed hydrocarbons by the burn-off converter located downstream of the adsorber.

In a second aspect the efficiency of the burn-off converter is further improved by promoting mixing of the exhaust gases immediately upstream of the converter. In a preferred embodiment, a mixing plate disposed between the adsorber and the burn-off converter acts to promote more uniform pre-heating of the burn-off converter as well as better distribution across the converter of hydrocarbon effluents released by the adsorber.

DESCRIPTION OF THE DRAWINGS

The invention may be further understood by reference to the drawings, wherein.

DETAILED DESCRIPTION

Figure 1:
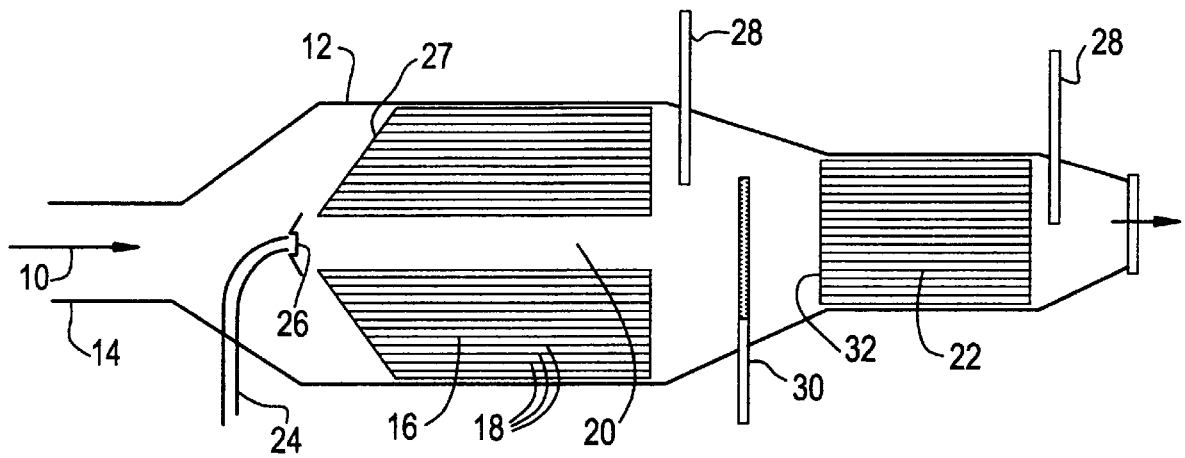
FIG. 1 is a cross-sectional elevational view of an embodiment of apparatus provided in accordance with the invention.

A particular example of an engine exhaust system incorporating the improved adsorber system of the invention is illustrated in FIG. 1 of the drawing, which presents a schematic elevational cross-section of a typical system design, not in true proportion or to scale. As shown in FIG. 1, exhaust gas flowing from an engine (not shown) in the direction of arrow 10 enters enclosure 12 through exhaust conduit 14. Disposed within enclosure 12 is an adsorber 16, that adsorber comprising a honeycomb having a plurality of cells or through-channels 18 through which the exhaust gases may pass.

Adsorber 16 also features a by-pass port 20, consisting of a central hole through the honeycomb, through which exhaust gases may flow to by-pass channels 18 and impinge more directly on catalytic converter 22 located downstream of adsorber 16. To direct the flow of exhaust gases away from port 20 and through adsorber channels 18 at cold-start, a diverter line 24 for supplying a diversion fluid such as secondary air from an external fluid source such as an air pump (not shown) is provided. The outlet 26 of the diverter line is positioned proximate to and upstream of by-pass port 20.

In accordance with a first aspect of the invention, adsorber 16 is provided with a tapered, convexly shaped inlet face 27 for the exhaust gas. The shape of inlet face 27 effects a relative shortening of channels 18 located at peripheral portions of adsorber 16 (i.e., portions near the wall of enclosure 12) with respect to channels located centrally and proximate to by-pass port 20.

Optional, but not required, components which may be provided in conjunction with the improved adsorber as shown in FIG. 1 of the drawing include sensor 28 for determining the concentrations of hydrocarbons or other species present in the exhaust, and secondary air inlets such as air injector port 30 for controlling the stoichiometry of the gases being treated. In addition, if desired, the inlet face of catalytic converter 32 may be convexly configured in order to make the exhaust gas velocities through the channels of that converter more uniform. And finally, as hereinafter more fully described, an optional flow-converging inlet cone may be provided immediately upstream of the adsorber to shape and direct the exhaust gas stream more effectively into the adsorber port.

In the operation of the system shown in FIG. 1, exhaust gases from the engine which are supplied to adsorber 16 through exhaust conduit 14 are initially diverted away from by-pass port 20 and through honeycomb channels 18 by introducing a stream of diversion fluid (e.g. secondary air) through line 24 and outlet 26 at engine startup. In this way the unburned fuel and combustion by-products present at cold start are trapped on the adsorber honeycomb.

Advantageously, because of the tapered shape of inlet face 27 of adsorber 16 in this design, the flow of exhaust gases carrying the unburned or partially burned hydrocarbons through channels 18 of the adsorber is rendered more uniform. That is, gas flow velocities through the channels proximate to the honeycomb periphery are increased to more closely approximate the reduced gas flow velocities through the channels proximate to the center port.

After the temperature of the exhaust gases has risen and the concentration of unburned hydrocarbons in the exhaust stream is reduced, diversion of the exhaust stream away from by-pass port 20 by the secondary air is terminated and the heated exhaust gases are permitted to pass directly through by-pass port 20 to burn-off catalytic converter 22 mounted downstream of the adsorber. This converter then reaches its light-off temperature, and thereafter operates to oxidize those hydrocarbons released by the adsorber as adsorbent temperatures rise in the course of further engine operation.

The advantages of a system incorporating this adsorber design are two-fold. First, the effectiveness of the adsorber is improved since the adsorption capacity of the honeycomb channels near the honeycomb periphery is more fully utilized. Secondly, the life of the adsorber can be extended since the reduced exhaust flows through the honeycomb channels proximate to the by-pass channels during hot engine operation reduce the service temperatures to which those portions of the adsorber honeycomb must be subjected in use.

The precise shape of the inlet face of the adsorber is not critical. Convex shapes which may be considered for use in the invention include conical or frustoconical shapes as well as shapes which are stepped or smoothly curved to circular, parabolic, or elliptical profiles. Combinations of various curves and facets may also be used.

It is also possible to utilize the tapered inlet face design for the catalytic converter disposed downstream of the adsorber honeycomb, as well as for any light-off or main underbody catalytic converters located upstream of the adsorber. The use of tapered inlet designs for these converters can help to make the flow of exhaust gases more uniform through the channels of these honeycombs as well, by tending to equalize channel exhaust gas flow velocity through peripheral channels with that through centrally disposed channels.

Figure 2:
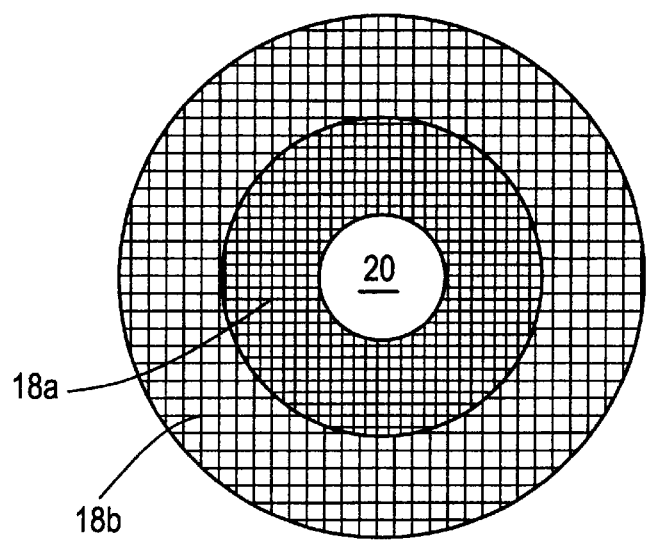
FIG. 2 is an end view of an alternative honeycomb adsorber offering gas flow control in accordance with the invention.

An alternative design for an adsorber provided in accordance with the invention is a design where the average hydraulic diameter of the first plurality of honeycomb channels proximate to the by-pass port is smaller than the average hydraulic diameter of the second plurality of honeycomb channels proximate to the periphery of the honeycomb. An example of such an adsorber is schematically illustrated in FIG. 2 of the drawing, which is an end view of the inlet face of an adsorber honeycomb of this type. As shown in FIG. 2, the first plurality of honeycomb channels in region 18a of the honeycomb inlet face are of smaller size than the second plurality of honeycomb channels in region 18b of that face. Thus the average hydraulic diameter of channels 18b is higher than that of channels 18a, and the exhaust gas flow velocities through the latter channels is correspondingly reduced.

As is conventional, additional catalytic converters may be provided downstream or, more commonly, upstream of the adsorber system shown in FIG. 1. For example, in the system of published European application EP 0697505, the main catalytic converter for the engine, which may be a main catalyst or a pre-catalyst, is typically located upstream of the adsorber enclosure for more rapid light-off. The adsorber and burn-off (downstream) converter then function principally to trap and later oxidize hydrocarbons passing through the main catalytic converter during the cold-start phase of engine operation. An example of an exhaust emissions control system of this type, but incorporating an improved adsorber in accordance with the invention, is shown in FIG. 3 of the drawing.

Figure 3:
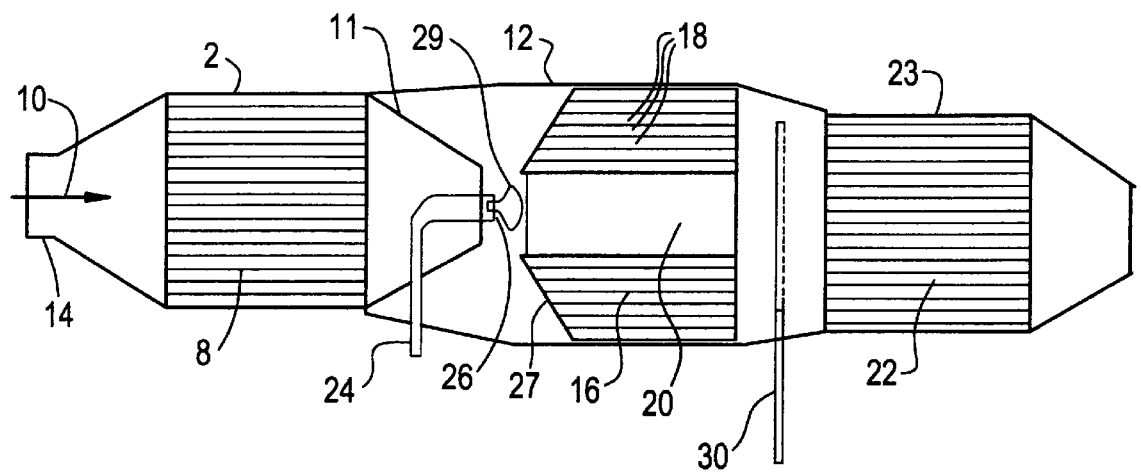
FIG. 3 is a cross-sectional elevational view of a second embodiment of apparatus provided in accordance with the invention.

With reference to FIG. 3, one concern of systems designers adapting these cold-start systems to production vehicles is the complexity of the secondary air sub-systems required to control exhaust stream stoichiometry through the various stages of the emissions control process. Currently developing adaptations of adsorber-based cold-start systems such as described in the above patent publications typically comprise an upstream catalyst stage (a large main catalyst or pre-catalyst), an adsorber stage, and a downstream or burn-off catalyst stage.

Ports for the injection of secondary air in these systems are usually provided at or upstream of the entrances to each of these stages, either to control gas stream stoichiometry or, in the case of the adsorber of EP 0697505, to control the path of the gas stream. These multiple air injection ports can necessitate the use of multiple air delivery systems, including separate air pumps, air delivery lines, and air flow control systems, in order to deliver the volumes of air to the various stages which have been thought to be required.

In the particular apparatus shown in FIG. 3, the primary or sole means for injecting secondary air into the adsorber section of the exhaust system of the invention, which is also the means for controlling the flow of exhaust gases through the adsorber, is diverter line 24 connecting with an external air source and terminating at outlet 26 within the adsorber enclosure section. Other sources of secondary air are merely optional.

In the operation of the system of FIG. 3, exhaust gas flowing from an engine (not shown) into enclosure section 2 through exhaust conduit 14 in the downstream direction of arrow 10 passes initially through a first catalytic converter 8. Although not shown in the drawing, a secondary air inlet for providing "main" secondary air is normally provided upstream of catalytic converter 8 to control oxygen levels in the exhaust gas being reacted in converter 8, although in the present system such an inlet is optional.

After traversing first converter 8 the exhaust gas passes into enclosure section 12 within which is disposed tapered adsorber 16, that adsorber consisting of a honeycomb having a tapered inlet face 27 and incorporating a plurality of through-channels 18 through which the exhaust gases may pass to adsorb unburned hydrocarbons contained therein. Adsorber 16 also includes a by-pass port 20 through which the exhaust gases can by-pass channels 18 to impinge more directly on burn-off converter 22 located in an enclosure 23 downstream of adsorber 16.

In the apparatus of FIG. 3, diverter line 24 entering enclosure section 12 operates not only to control the flow of exhaust gases through or away from port 20, but also serves as the sole or primary means for injecting secondary air into the system, that secondary air being delivered from an external air source such as an air pump (not shown). Outlet 26 of diverter line 24 is positioned proximate to and upstream of bypass port 20, being provided in this embodiment with a diverter or deflector body 29 configured to pattern the stream of secondary air most effectively to divert the exhaust gas stream away from by-pass port 20 and through channels 18 of the adsorber.

Also shown in this embodiment is an optional exhaust gas flow concentrator or collector, in this case consisting of open-ended convergent cone 11. That cone, joined at its larger end to the wall of adsorber enclosure section 12 upstream of the adsorber, functions to collect exhaust gases exiting first converter 8 and channel them more directly and effectively toward port 20.

All exhaust gas traversing enclosure 12 will enter burn-off converter 22 disposed in enclosure section 23, but that exhaust gas will at some stage require the addition of secondary air to achieve proper stoichiometry for hydrocarbon oxidation. In the embodiment of the invention shown in FIG. 3, most or all of this secondary air will be drawn from diverter line 24, so that no separate air inlet to enclosure section 23 will be required. Air inlet tube 30 for introducing minor proportions of additional secondary air into enclosure section 23 upstream of second catalytic converter 22 is merely optional.

For purposes of the present description, using diverter line 24 as the primary means for injecting secondary air in accordance with the invention means that diverter air will supply at least 60% of all secondary air required by the exhaust treatment system, i.e., the combination of the main catalyst, the adsorber, and the second or burn-off catalytic converter, at least during the initial phase of engine operation. By the initial phase of engine operation is meant the cold-start phase and the remaining stages of the so-called Bag I portion of the FTP (Federal Test Procedure) testing cycle prescribed by U.S. automotive engine emissions control regulations. When used as the sole means for injecting secondary air, the diverter line will of course provide 100% of the secondary air used by the system during the Bag I portion of the FTP cycle.

Table I below reports examples of test runs conducted on a tapered-adsorber-type cold-start engine exhaust system attached to a 4.0 liter gasoline engine, the exhaust system being configured substantially as shown in FIG. 3. As used for testing, the exhaust system included standard provisions for the introduction of secondary air upstream of the first or main catalytic converter (Main Air) and the second or burn-off catalytic converter (Burn-off Air), as well as through the diverter outlet upstream of the adsorber (Diverter Air). In each of these test runs Diverter Air was supplied using a commercially available electric air pump capable of air outputs up to 9 cubic feet per minute (cfm) under all of the exhaust back-pressure conditions encountered in the testing.

All tests were conducted in accordance with the FTP procedure for measuring accumulated engine exhaust emissions. Test results were compared on the basis of calculated grams of non-methane hydrocarbons (NMHC) emitted per mile during the entire FTP test cycle, even though the control strategies and equipment of the invention impacted hydrocarbon emissions only during the Bag I portion (the initial approximately 505 seconds) of the test. Attaining LEV emissions levels requires that NMHC emissions be maintained at average levels not exceeding 0.075 grams of hydrocarbons per mile over the duration of the FTP test cycle.

Reported in Table I for each of five exhaust system tests conducted are a Test Identification (ID) number as well as the secondary air flows supplied to the main catalyst (Main Cat. Air), through the diverter line to the adsorber enclosure section (Diverter Air), and to the burn-off catalyst (Burn-off Cat. Air), during each of three stages of the Bag I portion of the test. Gas flows are reported in cubic feet per minute (cfm) and the calculated non-methane hydrocarbon emissions (NMHC) for the entire test cycle are reported in grams per mile. The three stages of the Bag I portion of the test comprised an initial or cold-start test stage (0–60 seconds), during which only main catalyst and/or diverter air were supplied, an intermediate stage (60–250 seconds) during which, optionally, only burn-off catalyst air was supplied, and a final stage (>250–505 seconds) during which, optionally, only diverter air was supplied.

adsorber has reached light-off. Heating the burn-off converter to light-off occurs subsequent to the initial adsorption phase, and is achieved by deactivating the diverter and allowing hot exhaust gas to traverse the by-pass port and impinge directly on the converter. After light-off, oxidation of the adsorbed hydrocarbons is effected by resuming the flow of secondary air through the diverter at a somewhat reduced flow rate, in order to direct some hot exhaust gas through the channels of the adsorber.

Hot exhaust gas from the by-pass port which is directed at the burn-off converter for converter light-off flows primarily through the central portion of the converter, with the result that the converter is unevenly heated. On the other hand, exhaust gas later diverted through the channeled portion of the adsorber for hydrocarbon desorption purposes tends to be cooled as it passes through the adsorber honeycomb channels and evaporates adsorbed hydrocarbons. These cooler, peripherally flowing gases, which contain the highest hydrocarbon concentrations, tend to flow peripherally toward and through the peripheral or cooler portions of the burn-off catalyst. The result of this flow behavior is sub-optimal oxidation of the hydrocarbons released by the adsorber.

In accordance with the invention this problem is overcome through the adoption of means designed to achieve better mixing of cold and warm exhaust gases prior to entry into the burn-off converter inlet. A specific example of such a system, wherein the additional feature consists of an

TABLE I

| Test ID No. | Initial Bag I Stage (cold-start: 0–60 secs.) | | Intermediate Bag I Stage (60–250 secs.) | Final Bag I Stage (250–505 secs.) | Non-methane Hydrocarbon Emissions NMHC (g/mi) |
|---|---|---|---|---|---|
| | Main Cat. Air (cfm/sec) | Diverter Air (cfm/sec) | Burn-off Cat. Air (cfm/sec) | Diverter Air (cfm/sec) | |
| 6 | 4 cfm/20–60 | 9 cfm/0–60 | 4 cfm/60–250 | 4 cfm/250–505 | 0.036 |
| 11 | none | 9 cfm/0–60 | 4 cfm/60–250 | 4 cfm/250–505 | 0.043 |
| 13 | none | 9 cfm/0–60 | none | none | 0.046 |
| 14 | none | 9 cfm/0–60 | none | 4 cfm/380–505 | 0.05 |
| 15 | none | 9 cfm/0–60 | none | 4 cfm/250–505 | 0.049 |

As is apparent from a study of the data set forth in Table I, while the introduction of supplemental secondary air through either the main catalyst alone (Test 11), or through both the main catalyst and the burn-off catalyst (Test 6) appears to result in the most complete hydrocarbon oxidation in these systems, the use of these supplemental secondary air sources is not required. Instead, the use of diverter air as the sole source of secondary air, either during the cold-start stage only (Test 13) or during both the cold-start and final stages of the Bag I portion of the test (Tests 14 and 15), provides sufficient control over hydrocarbon emissions that LEV emissions standards for NMHC hydrocarbons emitted during the FTP test cycles are easily met. Thus a significant simplification of the secondary air sub-systems needed for these adsorber-based engine emissions control systems has been achieved in these systems.

A further approach toward improving the efficiency of the cold-start adsorber systems of the invention resides in better controlling the handling of the unburned hydrocarbons released by the adsorber after the engine and catalysts have reached operating temperatures. As noted above, desorption of the hydrocarbons from the adsorber is promoted only after the burn-off catalyst located downstream from the exhaust gas mixing plate positioned downstream of the by-pass port and upstream of the burn-off converter, is illustrated in FIG. 4 of the drawing.

Figure 4:
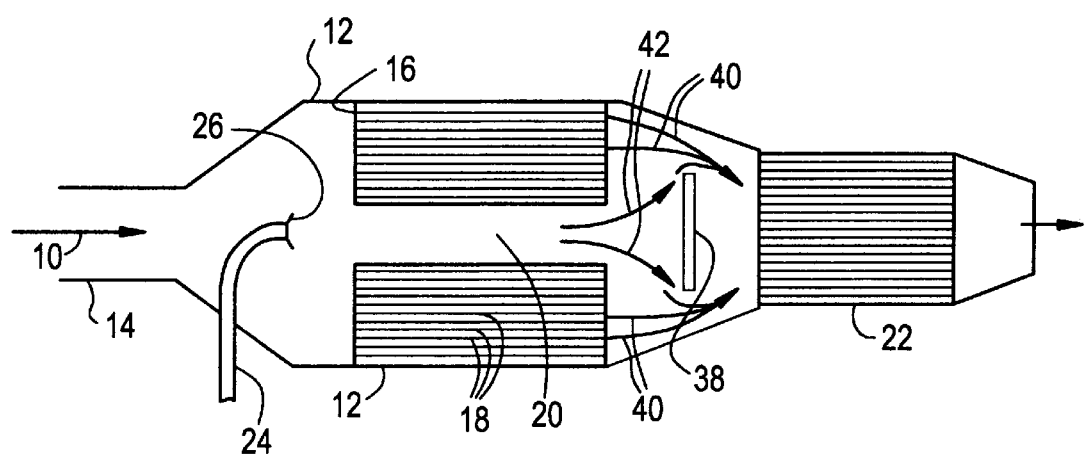
FIG. 4 is a cross-sectional elevational view of a third embodiment of apparatus provided in accordance with the invention

In the operation of the adsorber system of FIG. 4, exhaust gases flowing from an engine and main catalyst (not shown) enter enclosure 12 in the direction of arrow 10 through exhaust conduit 14. Within enclosure 12, the gases traverse adsorber body 16, that body comprising a honeycomb having a plurality of adsorbing cells or through-channels 18 through which the exhaust gases may pass, and also having a by-pass port 20 through which exhaust gases can flow in order to by-pass adsorber channels 18.

At engine startup, the flow of exhaust gases is directed away from by-pass port 20 and into adsorber channels 18 by means of diverter 24 which delivers, from its outlet 26, a diversion fluid such as secondary air generated by an external fluid source such as an air pump (not shown). Unburned hydrocarbons present in the exhaust are thus trapped on adsorber 16.

As the concentration of unburned hydrocarbons in the exhaust stream drops following engine heat-up, the flow of secondary air is reduced or stopped, allowing most of the heated exhaust gases to pass directly through by-pass port 20 toward burn-off converter 22. In the apparatus of FIG. 4, however, those gases do not impinge directly on converter 22, but instead impinge first upon exhaust gas mixing plate 38 where they are deflected and intermixed prior to entry into the burn-off catalyst.

Once the burn-off converter has been heated to its light-off temperature, a diverting flow of secondary air through diverter outlet 26 is started. This redirects a portion of the heated exhaust gases through channels 18 in adsorber 16, thereby accelerating the desorption of hydrocarbons therefrom. Upon exiting adsorber 16, however, the cooler, hydrocarbon-rich exhaust gases (indicated by arrows 40 in FIG. 4) do not flow directly into converter 22, but first encounter the warmer exhaust gases from by-pass port 20 (indicated by arrows 42 in FIG. 4), the latter having impinged upon and been deflected outwardly by mixing plate 38. The result is that the cooler exhaust gases traversing channels 18 are mixed with the warmer exhaust gases from by-pass port 20, thereby providing a feed steam for converter 22 which is more homogeneous with respect to both temperature and hydrocarbon content.

From the foregoing description it can be seen that the adsorber system of the invention offers at least two distinct advantages over conventional systems. First more even heating of the burn-off catalyst is achieved by the heated exhaust gases traversing the by-pass port after engine warm-up. Secondly, the need to catalytically process relatively cool streams of exhaust gas containing hydrocarbons desorbed from the adsorber is largely avoided. These advantages provide a significantly more complete oxidation of unburned hydrocarbons than can be provided by conventional systems.

We claim:

1. An adsorber for the adsorption of hydrocarbons present in a combustion exhaust gas stream which comprises:

a honeycomb structure having a central portion and a peripheral portion, each portion incorporating multiple through-channels having hydrocarbon-adsorptive channel walls extending from an inlet face to an outlet face of the structure;

a by-pass port passing through the central portion from the inlet face to the outlet face thereof;

the through-channels comprising a first plurality of channels proximate to the bypass port having a relatively high resistance to exhaust gas flow and a second plurality of channels traversing the peripheral portion having a relatively low resistance to exhaust gas flow.

2. An adsorber in accordance with claim 1 wherein the first plurality of channels has an average length exceeding an average length of the second plurality of channels.

3. An adsorber in accordance with claim 1 wherein at least one of the inlet face and the outlet face of the honeycomb structure is convexly shaped.

4. An adsorber in accordance with claim 1 wherein the first plurality of channels has an average hydraulic diameter which is less than an average hydraulic diameter of the second plurality of channels.

5. A combustion engine exhaust treatment system comprising:

(i) an adsorber mounted in an enclosure positioned in an engine exhaust system for treating exhaust gases from an engine, the adsorber comprising a honeycomb structure having a central portion and a peripheral portion, each portion being provided with multiple through-channels having hydrocarbon-adsorptive channel walls extending from an inlet face to an outlet face of the honeycomb structure and the central portion being provided with a by-pass port extending from the inlet face to the outlet face;

(ii) a catalytic converter mounted downstream of the adsorber, and (iii) a diverter line having an outlet within the enclosure and upstream of the by-pass port for delivering a diversion fluid through the outlet from a fluid source external to the enclosure;

wherein the through-channels comprise a first plurality of channels proximate to the by-pass port having a relatively high resistance to exhaust gas flow and a second plurality of channels traversing the peripheral portion having a relatively low resistance to exhaust gas flow, and wherein the first plurality of channels have an average hydraulic diameter which is less than an average hydraulic diameter of the second plurality of channels.

6. A combustion engine exhaust treatment system comprising:

(i) an adsorber mounted in an enclosure positioned in an engine exhaust system for treating exhaust gases from an engine, the adsorber comprising a honeycomb structure having a central portion and a peripheral portion, each portion being provided with multiple through-channels having hydrocarbon-adsorptive channel walls extending from an inlet face to an outlet face of the honeycomb structure and the central portion being provided with a bypass port extending from the inlet face to the outlet face;

(ii) an exhaust gas flow concentrator mounted in the enclosure at a-position upstream from the adsorber, the concentrator being positioned to collect and direct exhaust gases entering the enclosure toward and into the by-pass port;

(iii) a catalytic converter mounted downstream of the adsorber, and (iv) a diverter line having an outlet within the enclosure and upstream of the by-pass port for delivering a diversion fluid through the outlet from a fluid source external to the enclosure;

wherein the through-channels of the adsorber comprise a first plurality of channels proximate to the by-pass port having a relatively high resistance to exhaust gas flow and a second plurality of channels traversing the peripheral portion having a relatively low resistance to exhaust gas flow; and wherein the first plurality of channels have an average hydraulic diameter which is less than an average hydraulic diameter of the second plurality of channels.

7. A combustion engine exhaust treatment system comprising:

(i) an exhaust conduit supplying an exhaust gas from a combustion engine to a first catalytic converter mounted in an enclosure downstream from the engine;

(ii) an adsorber mounted in an enclosure downstream of the first converter for receiving exhaust gas therefrom, the adsorber comprising a honeycomb structure having a central portion and a peripheral portion, each portion being provided with multiple through-channels having hydrocarbon-adsorptive channel walls extending from an inlet face to an outlet face of the honeycomb structure and the central portion being provided with a by-pass port extending from the inlet face to the outlet face;

(iii) a burn-off catalytic converter mounted downstream of the adsorber, and (iv) a diverter line having an outlet within the enclosure and upstream of the by-pass port for delivering a diversion fluid comprising secondary air through the outlet from a source external to the enclosure;

wherein the diverter line constitutes the primary or sole means for injecting a supply of secondary air into the exhaust treatment system, and wherein the multiple through-channels in the central portion have an average hydraulic diameter which is less than an average hydraulic diameter of the multiple through-channels in the peripheral portion.

8. A combustion engine exhaust treatment system in accordance with claim 7 wherein the diverter line provides at least 60% of the supply of secondary air required for treatment of the exhaust gas from the engine during the initial phase of engine operation.

9. A combustion engine exhaust treatment system comprising:

(i) an exhaust conduit supplying exhaust gas from a combustion engine to an adsorber mounted in an enclosure downstream of the engine, the adsorber comprising a honeycomb structure having a central portion and a peripheral portion, each portion being provided with multiple through-channels having hydrocarbon-adsorptive channel walls extending from an inlet face to an outlet face of the structure and the central portion being provided with a by-pass port extending from the inlet face to the outlet face;

(ii) a catalytic converter mounted downstream of the adsorber;

(iii) a diverter line having an outlet within the enclosure and upstream of the by-pass port for delivering a diversion fluid through the outlet from a fluid source external to the enclosure; and (iv) exhaust gas mixing means disposed between the catalytic converter and the by-pass port, the mixing means being positioned to deflect and mix exhaust gases traversing the by-pass port.

10. A combustion engine exhaust treatment system in accordance with claim 9 wherein the exhaust gas mixing means comprises a mixing plate disposed downstream of the by-pass port.

* * * * *